(12) United States Patent
Falbel (10) Patent No.: US 7,106,430 B2
(45) Date of Patent: Sep. 12, 2006

(54) AIRBORNE SEARCH AND RESCUE SCANNER

(76) Inventor: Gerald Falbel, 472 Westover Rd., Stamford, CT (US) 06902

( * ) Notice: Subject to any disclaimer, the term of this patent is extended or adjusted under 35 U.S.C. 154(b) by 280 days.

(21) Appl. No.: 10/820,300

(22) Filed: Apr. 8, 2004

(65) Prior Publication Data

US 2005/0225777 A1    Oct. 13, 2005

(51) Int. Cl.
*G01B 11/26* (2006.01)
*G01C 1/00* (2006.01)
(52) U.S. Cl. ............ 356/140; 356/138; 356/141; 356/139
(58) Field of Classification Search ............... 356/140
See application file for complete search history.

(56) References Cited

U.S. PATENT DOCUMENTS 3,820,742 A * 6/1974 Watkins .................. 244/3.11
4,131,791 A * 12/1978 Lego, Jr. ..................... 398/171
2002/0181839 A1 * 12/2002 Brown et al. ................. 385/16

* cited by examiner

*Primary Examiner*—Thomas H. Tarcza
*Assistant Examiner*—Luke D. Ratcliffe
(74) *Attorney, Agent, or Firm*—Mark P. Stone (57) ABSTRACT

An airborne search and rescue scanner is provided to locate a missing person wearing a reflector for reflecting laser energy emitted from a scanner in a high speed aircraft. The scanner and reflector combination enable scanning of a large search area in a relatively short time period. The system is designed to prevent false readings, as for example, sun glint reflected by the reflector, or false alarms resulting from reflections from the terrain being searched and not the reflector worn by the missing person. In an alternative embodiment of the invention, the active laser scanning system is replaced by a passive infrared scanner by replacing the laser scanner with an infrared detector. In this embodiment, it is not necessary for the missing person to wear a reflector.

14 Claims, 9 Drawing Sheets

COMBAT SEARCH AND RESCUE SCANNER MODIFIED INTO IRST SCANNER

FIG. 9

AIRBORNE SEARCH AND RESCUE SCANNER

The United States Government has a paid-up license in this invention and the right in limited circumstances to require the patent owner to license others on reasonable terms as provided for by the terms of Small Business Innovative Research Grant No. F-29601-02-C-0101, awarded by the United States Air Force.

BACKGROUND OF THE INVENTION

The present invention is directed to an airborne search and rescue scanning system particularly for locating missing persons using high speed aircraft capable of scanning large search areas in very short time periods at relatively high altitudes.

More particularly, the search and rescue system in accordance with the present invention is intended to quickly and precisely locate a downed aircraft pilot in enemy territory in a radio-silent regime using optical detection means. Additionally, the system can be used for general search and rescue operations to locate persons lost on the ground or in water by high speed aircraft.

The features and advantages of the airborne search and rescue scanning system in accordance with the present invention will be described in greater detail in accordance with the accompanying drawings.

SUMMARY OF THE INVENTION

An airborne search and rescue scanner system is provided for use in high speed aircraft flying at relatively high altitudes capable of scanning large search areas in relatively short time periods. In particular, the system is particularly adapted for quickly and precisely locating a downed military pilot in enemy territory in a radio-silent regime using optical detection means.

In accordance with the preferred embodiment of the present invention, a scanner including a pulsed diode laser is provided on board an aircraft. The laser provides illumination for an optical corner cube worn by a downed pilot. The corner cube assembly has a near hemispherical field of view so that it efficiently reflects and returns laser irradiances to their source on the search aircraft from any angle in the upper hemisphere centered on the downed pilot.

The corner cube assembly worn by the downed pilot reflects light only back to the source on the aircraft in a very narrow beam to avoid the possibility of sun glint from the corner cube being viewed by the search scanner unless the scanner is in direct line between the downed pilot and the sun. In this unusual condition, the sun shadow of the aircraft will cover the pilot, thereby rendering negligible the possibility that sun glint will be seen by search scanner.

The airborne search and rescue system in accordance with the present invention also includes means for minimizing false alarms resulting from reflections from terrain in the search region. A computer is programmed with an algorithm which looks for the signal presence above the threshold for only one or four adjacent pixels in two dimensions. The corner cube reflector can subtend only a point source, while laser reflections from extended diffuse sources must subtend multiple pixels. Although it is possible to obtain one or two pixel signals from specular objects such as polished stone or water glints, these reflections can only occur for a single search aircraft pass angle, and would not be seen on a second fly-by by the search aircraft at a slightly different course with respect to the sun line.

Additionally, it is within the scope of the present invention, to provide narrow band optical filters, for use in connection with the corner cube assembly, centered on the lasers center wavelength. These filters will absorb or diffuse visible light to prevent eye detection of the corner cubes with simple search lights. The filters can also be used in more sophisticated systems in which, in accordance with a pre-arranged secret schedule for different days or hours, different filters are arranged to be matched with different lasers to prevent or impede enemy search aircraft from locating the missing person. In this manner, only preselected wavelengths of light will be reflected back to the aircraft, and the preselected wavelength to be reflected can be selectively varied.

Preferably, each laser scan will overlap the search area scanned by the preceding scan so that each area is scanned twice.

In a further embodiment of the invention, the active laser scanner is replaced by a passive infrared detector. In this embodiment, it is not necessary for the missing person to wear a reflective device.

DESCRIPTION OF THE BEST MODES FOR CARRYING OUT THE INVENTION

The preferred embodiments of the present invention will now be discussed with respect to FIGS. 1–9 of the drawings.

This system is intended to locate a downed pilot in enemy territory in a radio-silent regime using optical detection means. It can also be used for general search and rescue operations to locate lost people on the ground and in the water using high speed aircraft, capable of scanning large search areas in very short times.

The active subsystem of the scanner is composed of an 80 watt, Nuvonyx liquid cooled, 90% duty cycle, pulsed diode laser with built-in collimating optics operating at 806 nm. This laser illuminates a passive optical corner cube assembly that uses zero electrical power (shown in FIG. 4) mounted on the downed pilot's bare head with a chin strap. The corner cube assembly has a near hemispherical field of view, so that it efficiently returns laser irradiances to their source (on the search aircraft) from any angle in the upper hemisphere centered on the downed pilot. It has a diameter of only 3.4 inches and a weight of less than 0.75 lb. It will be carried in the pilot's survival kit with a chin mounting strap designed to mount the corner cube assembly on top of the pilot's bare head.

Since the corner cube assembly reflects a light source only back on the source in a very narrow beam less than 1 milliradian wide, there is no possibility of a sun glint from the corner cube being seen by the search scanner (or an enemy aircraft) unless the scanner or viewer is in a direct line between the downed pilot and the sun. However, the sun shadow of the aircraft will always cover the pilot and the corner cube in this unique condition. Therefore, it can be concluded that there is negligible possibility of a sun glint from the narrow divergence angle corner cube being seen by the search scanner or enemy search aircraft.

Figure 1:
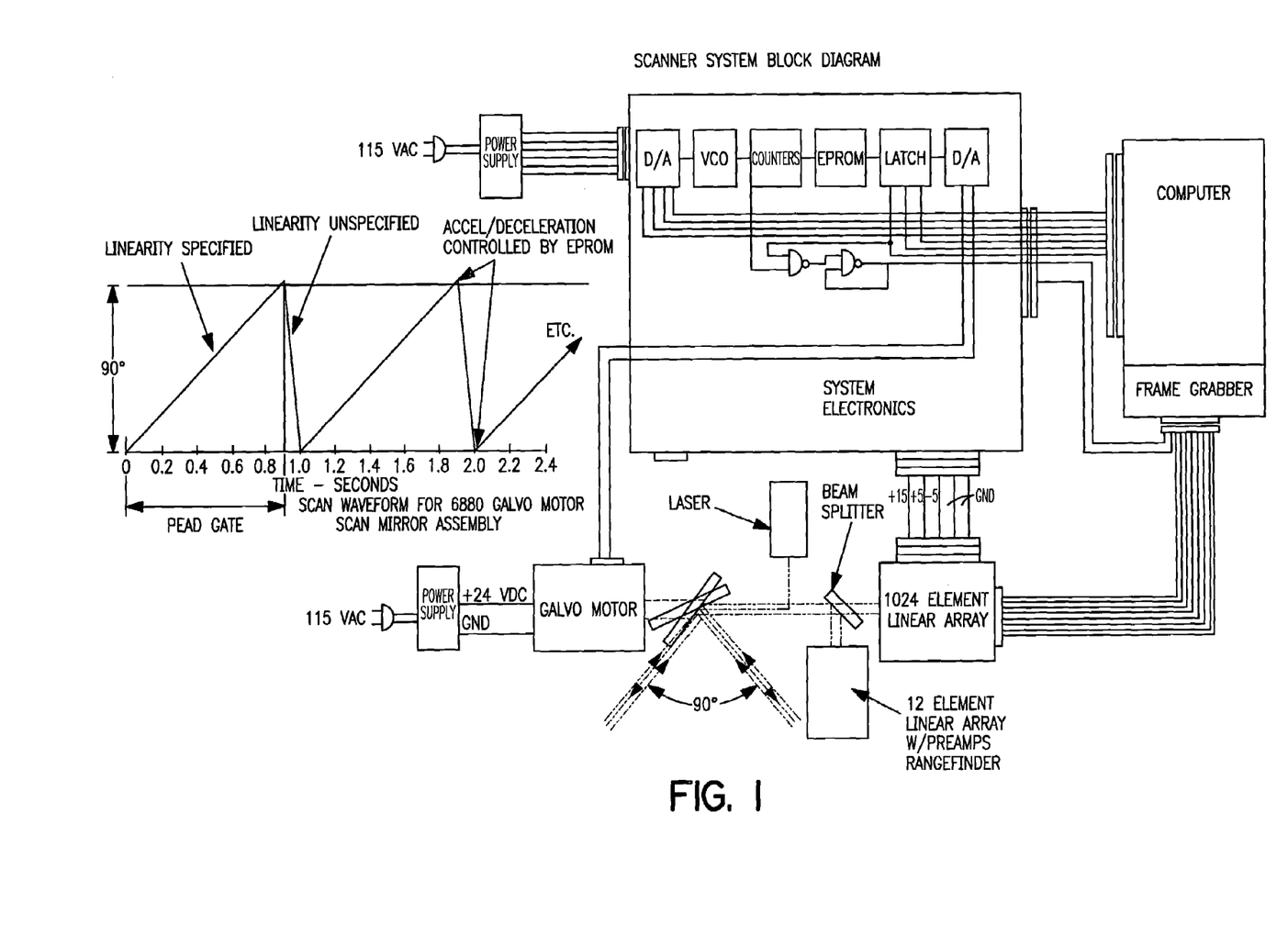
FIG. 1 is a block diagram of a scanner system in accordance with a first embodiment of the present invention.
Figure 2:
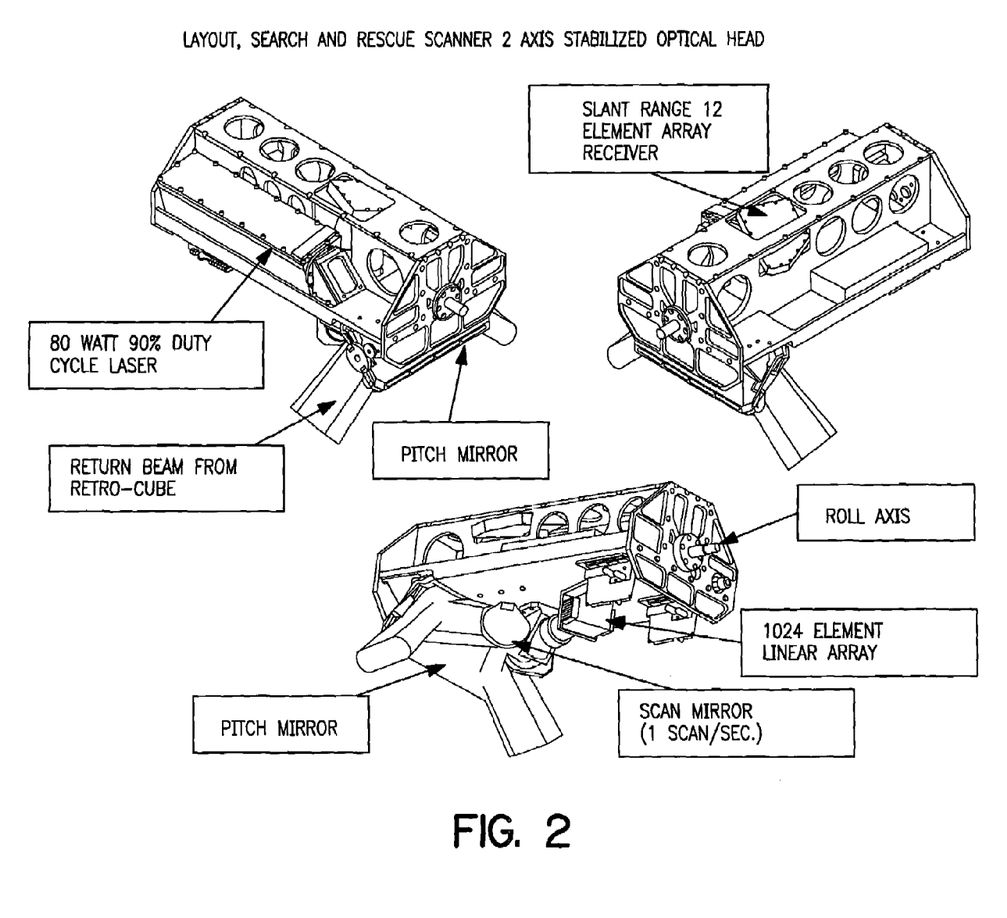
FIG. 2 illustrates, in perspective, an optical head configuration for the airborne search scanner in accordance with a first embodiment of the present invention.

FIG. 1 shows the overall block diagram of the Search and Rescue Scanner. FIG. 2 shows the optical head configuration of the airborne search scanner. It is composed of a 1.6" diameter refractive optical system, based upon a Fujunon CF 75A f/1.8 lens, which collects and focuses reflected laser light from the scanned area on a 1×1024 element, high speed silicon photodiode array in a DALSA PYRHA II-1024 element digital line scan camera with an RS-422, 8 bit digital output. In object space, this array subtends 7.82° along the ground track of the aircraft by 0.0076°. A small portion of the laser projected 0.01°×7.8° fan is reflected back to the scanner by a corner cube mounted on the downed pilot's bare head. A second array composed of 12, 1 mm.×1 mm. silicon cells, subtending 7.80°×0.77°, each with a separate preamp, is used to measure the slant range to the retro-cube from the aircraft, by measuring the time for the leading edge of the laser pulse to return to the scanner after initiation at the speed of light, which is approximately 1 ft. per nanosecond. At a 15,000 ft. slant range, this period is 30 µsec. which is readily measurable to ±10 ft. For applications where precise location of the downed person is not necessary (such as people lost at sea), the 1024 element array is not required, and the entire detection and location process can be accomplished with an array similar to the 12 element array with preamps. The size of this array is limited by the practical number of preamps.

A scan mirror driven by a Cambridge Technology Model 6880 galvanometer motor, scans this field of view over a 90° angle in a sawtooth scan pattern as is shown in FIG. 1, in the cross-track direction at a rate of one scan per second with a 90% duty cycle (100° per second). This is equivalent to a pixel cross-track scan rate-of 13,157 pixels per second. Therefore, in order to prevent underlap of the scanned cross track scene, the entire 1024 element linear array must be sampled at least every pixel dwell time, or 1/13,157 sec or 76 µsec. The signals from the array have a maximum pixel sampling rate of 17 µusec./line by a high speed, internal, dual-tap multiplexer. This scan rate provides a good safety factor relative to the 76 µsec. pixel dwell time.

Each cross track scan of 1.0 sec is initiated by a pulse from the scan mirror angular readout incorporated in the galvanometer motor.

The multiplexed signals are then converted into digital numbers by a built-in, 8–10 bit A/D converter in the DALSA camera.

The camera digital output is routed into a digital frame grabber, and then into a P4 Pentium computer. A ruggedized, miniaturized computer equivalent to the above is integrated into the intended F-16 aircraft wing pod, electrically, mechanically, and environmentally.

Figure 3:
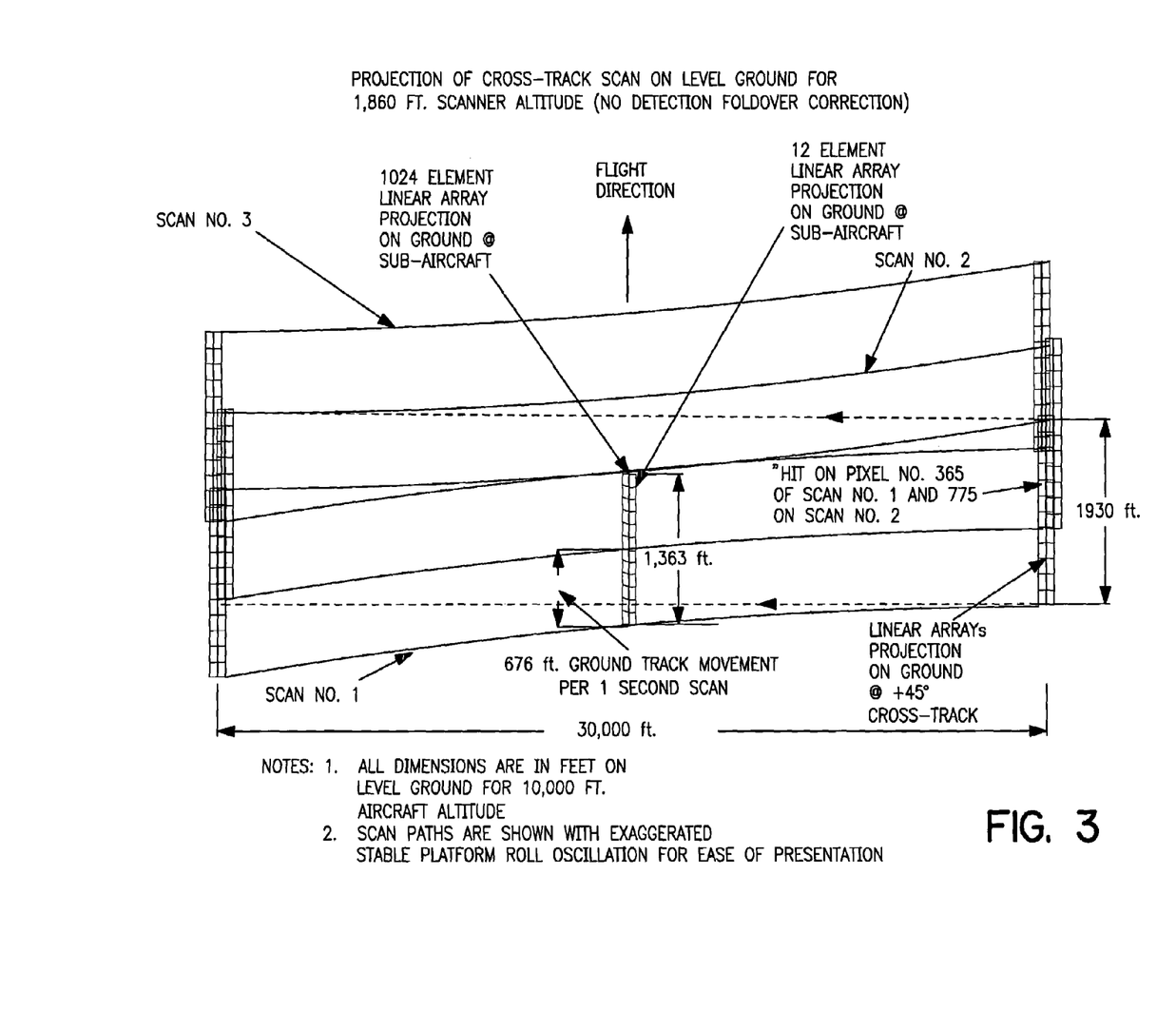
FIG. 3 illustrates a typical display of a scan pattern in accordance with a first embodiment of the present invention.
Figure 4:
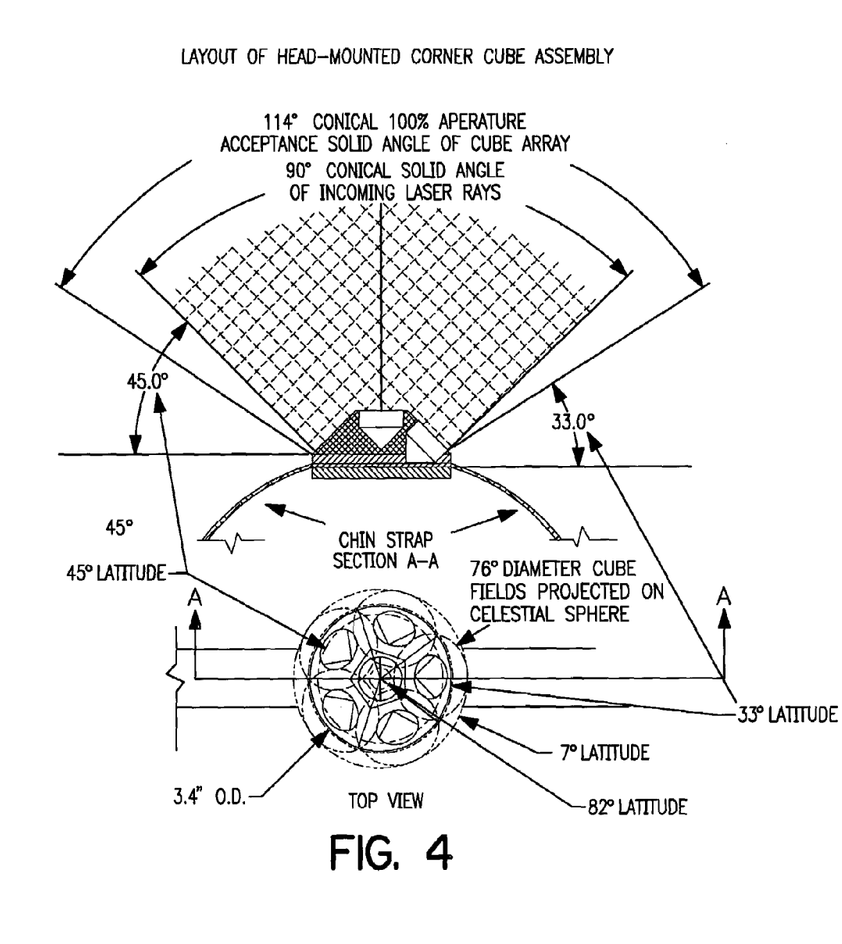
FIG. 4 illustrates a head-mounted corner cube assembly in accordance with a first embodiment of the present invention.
Figure 5:
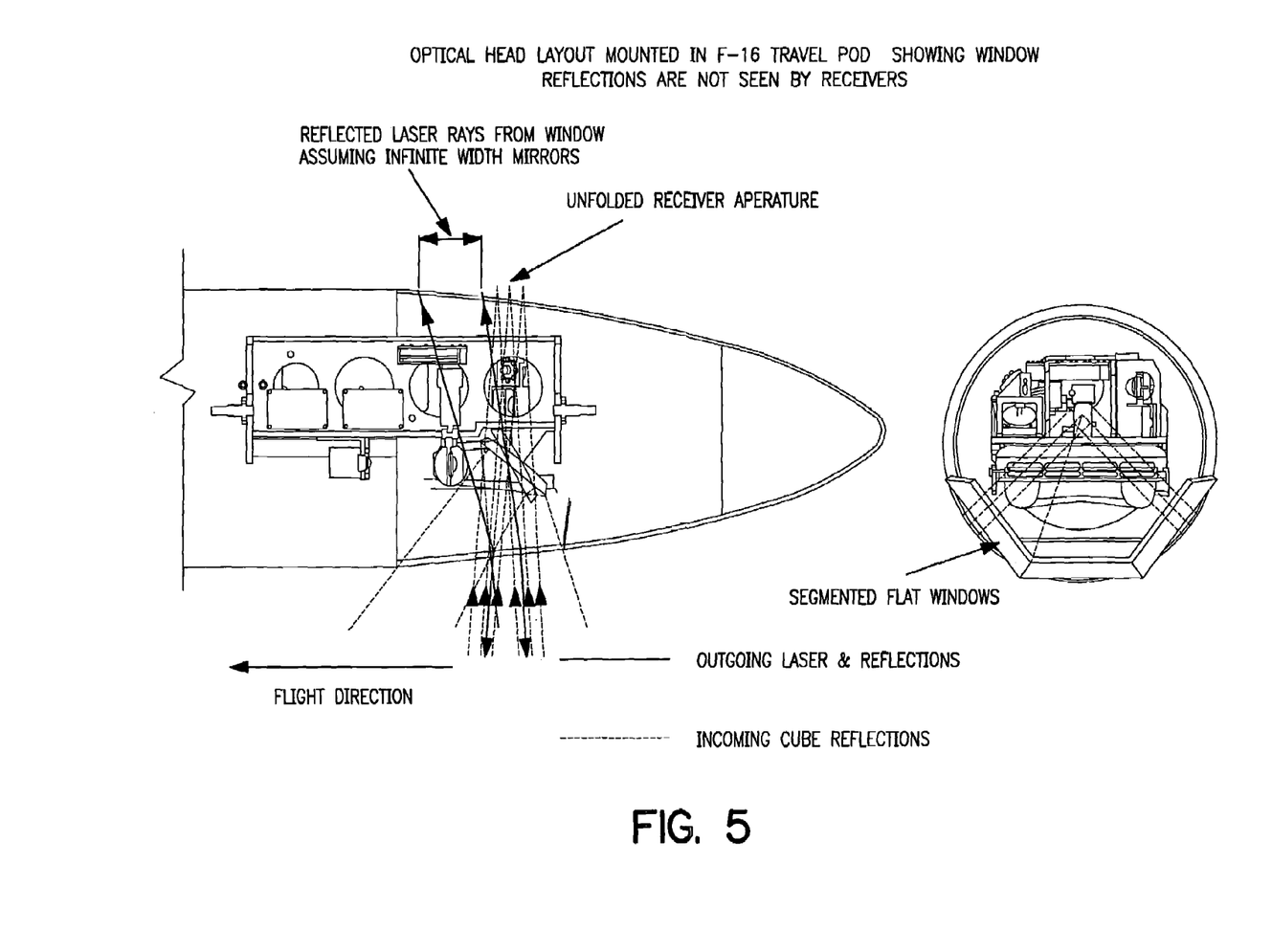
FIG. 5 illustrates an optical head in accordance with a first embodiment of the present invention mounted in an aircraft.
Figure 6:
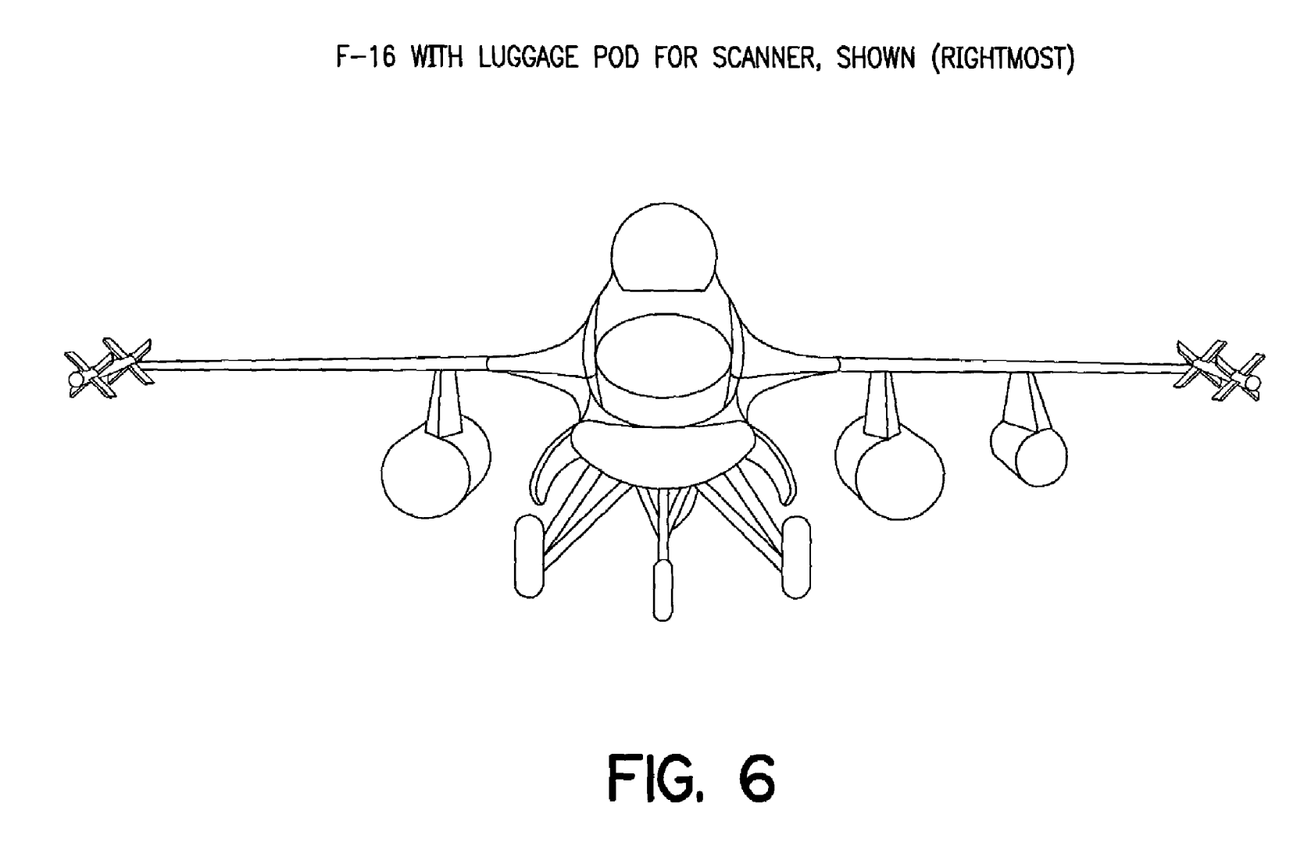
FIG. 6 illustrates an aircraft including a pod for a scanner, in accordance with a first embodiment of the present invention.
Figure 7:
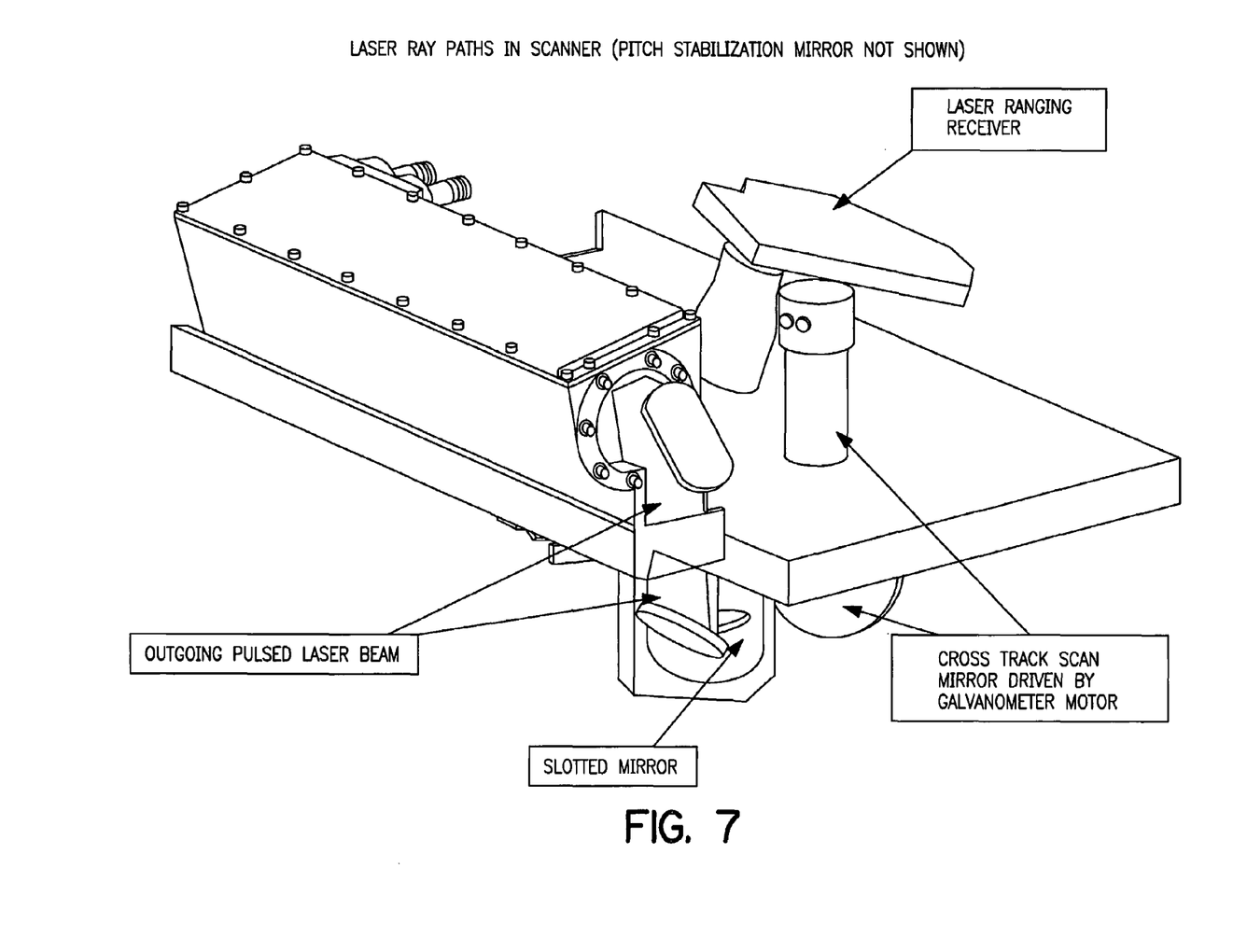
FIG. 7 illustrates laser ray paths in a scanner, in accordance with a first embodiment of the present invention.

The display on the computer monitor in the delivered equipment is along track and cross track coordinates that would apply to a ground coordinate grid pattern, which defines the scanned field of view of the cross track scan combined with the forward progress of the aircraft. This coordinate pattern is continuously updated based upon input from a global positioning satellite (GPS) receiver with forward motion of the aircraft. A typical display is shown in FIG. 3.

A video monitor would not be used in the final aircraft installation. Rather, an existing display in the F-16 cockpit will show the latitude and longitude of the detection relative to the GPS location of the aircraft at the time of the detection.

Further sophistication in target discrimination involves the use of CWT technology. This technology and software can detect the desired target within the background noise by accentuating its unique frequency characteristics. This technology can also be used to minimize false target detections caused by false "corner cubes" generated by, for example, reflective corrugated surfaces, which subtend more pixels than the true retro-reflector.

A further minimization of false alarms resulting from reflections from the terrain is accomplished by the computer processing. This is accomplished with an algorithm, which looks for signal presence above a fixed threshold for only one or four adjacent pizels in two dimensions. This results from the fact that the corner cube can subtend only a point source, while laser reflections from extended diffuse sources or large, "pseudo corner cubes" must subtend multiple pixels. It is possible to obtain one or two pixel signals from specular objects such as polished stone, water glints, but these reflections could only occur for a single search aircraft pass angle, and would not be seen on a second fly-by at a slightly different search aircraft course with respect to the sun line. Of course, the enemy could attempt to foil the search algorithm by seeding the search area with multiple corner cubes (at great expense). However, this can be counteracted by a computer program in the search set which would compare the stationary relative angular positions of the false corner cubes with the moving cube on the head of a downed pilot (who would be instructed to keep moving during the search). In addition, a more sophisticated recognition system would involve having the downed pilot mount on the corner cube assembly, a narrow band optical filter, centered on the laser's center wavelength coated on a hemipherical plastic or glass dome. These filters would absorb or diffuse visible light to prevent eye detection of the corner cubes with simple searchlights. These filters would also be used in mature versions of this system, on a pre-arranged secret schedule for specific days or hours, and would be matched to interchangeable specifc lasers installed for that schedule in the search scanner, operating at a continuing sequence of 810 nm, 830 nm . . . so that the enemy would have to guess what this schedule/filter arrangement was, or, alternatively use a broad band source such as a xenon are lamp as the illuminator. A xenon lamp is impractical for conversion into an extremely narrow, eye-safe beam, and requires a large amount of input electrical power.

A more sophisticated recognition system involves a Multiple Quantum Well optical modulator, developed by the Naval Research Lab. of the U.S. Navy which, when placed in front of the retro-cube, modulates the return laser beam at MHz rates, allowing sophisticated identification coding to be generated in the 76 µsec pixel look time.

By increasing the laser power to 80 watts, the altitude of the aircraft can be increased to above 10,000 feet thus providing more ground coverage per pass and minimizing the vulnerability of the aircraft to anti-aircraft fire. The exit aperture of this 80 watt laser is 25 mm.×40 mm. In order to align this laser beam coaxially with the return beam from the retro-cube, the optical system shown in FIG. 1 is necessary, where the laser beam is formed into a "chisel" shape and passes through a narrow slit in the combining mirror shown in FIG. 2.

The Nuvonyx diode laser incorporates proprietary optics, which converts the diode laser's emitted beam into a 7.8°×0.01° solid angle, with an outgoing beam aperture in one dimension of 25 mm.×40 mm. This beam is co-axially boresighted with the return beam using a slotted flat folding mirror, as is shown in FIG. 2.

The 1024 pixel wide scan swath is scanned along the cross-track path at 100°/second and retraces at greater than 1000°/second so that the 90° scan and retrace is completed in 1.0 seconds. Since each pixel subtends an angle of 0.0077°, this amounts to a pixel "look time" of 76 μsec.

At an aircraft altitude of 10,000 ft., as shown in FIG. 3, the along-track ground track subtense of the 1024 pixel linear array is 1363 feet. Since the array is scanned across-track once per second, in order to provide 50% coverage of the nadir and more overlap at the extremes of the scan swath, the F-16 aircraft speed is set at 400 knots.

The coordinates of hits detected in the cross track scan are determined as follows:

1. The latitude and longitude coordinates of the sub aircraft point is obtained from the GPS (global positioning satellite receiver).
2. The coordinate of the detection in the cross track direction is determined by the sine of the scan angle from the local vertical as measured by the angular readout on the galvanometer motor driving the scan mirror.
3. The encoder angle which defines the hit as related to the nadir scan angle is defined as $\phi$.
4. The coordinate of the detection is located relative to the nadir coordinate is defined as: (Slant range measurement) sin $\phi$.
5. The coordinate of the detection in the along track direction relative to the nadir is located is defined as: (pixel number −512)×0.13 mrad.×(slant range).

Once the pilot receives the coordinates of the detection, the "hit" is confirmed on the overlap repeat scans. These repeat scans also eliminate false "retrocube signals" generated by corrugated reflective roofs, which produce retro-cube returns in only one axis, and therefore will not be seen in a rescan where one of the coordinate angles has changed.

Definition of the Aircraft

An F-16 test aircraft using a modified "luggage" pod (See FIG. 4) has been defined as the test aircraft. However, by incorporating the vertical gyro module into the pod, the pod can be integrated into any aircraft capable of mounting the pod, or capable of mounting the scanner assembly in the bottom of its fuselage.

Incorporation of a Pulsed Laser Rangefinding Capability

In order to insure the location of the downed pilot accurately when the search aircraft is flying over non-flat terrain, a direct line of sight range measurement from the search aircraft to the downed pilot is necessary. This is accomplished as follows:

a. The 1024 element CCD linear array cannot be used as the detector for a pulsed laser ranging system, because the timing of the return pulse requires a separate channel for each geographic location. The return of the laser pulse from the corner cube is drowned out by the return from the surrounding terrain by a factor of over 1000/1, and the use of a 1000 element linear array with 1000 preamps is considered impractical.

b. The proposed solution is to use a 90% duty cycle pulsed laser in conjunction with a COTS 12 element silicon linear array. In operation, after initial detection by the CW laser and the 1024 element CCD array, the system scan is designed to have greater than 50% overlap so that every element in the scanned field is scanned at least twice.

c. The returned pulses define the 12 slant ranges in the along track direction and thereby define the slant range to the downed pilot to within a few feet, even in hilly terrain.

d. The slant range is then used to correct the downed pilot's GPS determined location assuming a flat terrain.

Detection/Location Sequence

1. The 12 element pulsed laser receiver array detects a hit in real time and measures its slant range.
2. The 1024 element array confirms the hit and provides seconds into the next scan, after evaluating the entire previous scan.
3. During the second scan, the 12 element array detects and confirms the hit in real time and remeasures its slant range, and can average the ranges to improve accuracy.
4. During the second scan, the 1024 element array reconfirms the hit and provides precise 2 dimensional location of the hit approximately 0.5 seconds into the third scan.
5. These reconfirmations are significant since they view the cube at different angles, inherently eliminating false targets, which do not act as retro-cubes.
6. The CWT detection transform provides a backup detection capability for operation in unfavorable conditions such as haze, rain, smoke which may affect detection by a fixed threshold.

Pitch and Roll Stabilization

The scanner system uses a unique pitch and roll stabilization system, described as follows:

Rather than using conventional "ball" 2 axis gimbals which would not fit into a pod, this scanner achieves stabilization with two galvanometer motors. Galvanometer motors are precise, limited angular travel servo torque motors which incorporate precision angular readouts and closed loop servo control electronics which serve to position their output shafts at the precise angle commanded at their input. This is accomplished with a very high frequency response and units are available with very high output torques.

Pitch stabilization is achieved with a large flat mirror, which directs the 90° scan pattern generated by the scan mirror downward to the ground. It is driven by a small, direct drive galvanometer motor, whose input is obtained from the vertical gyro reference.

Roll stabilization is achieved with a "Judo" servo, which uses the mass of the stabilized platform to advantage. Since the aircraft rolls around the scanner's roll axis, if its roll axis bearings were frictionless, no active roll stabilization would be required after initial erection. The roll stabilization galvanometer motor needs only to compensate for the small effect of bearing friction which could change the angle of the platform in inertial space. The heavier the stabilized platform, the higher its angular inertia, and the smaller angle that this friction force can move it from its inertial "happy point" aligned with the local vertical, as defined by the aircraft vertical gyro or inertial measurement unit. Thus, roll stabilization is provided by utilizing the rotational angular inertia of the stabilized platform for reducing the required torque and power of the roll stabilization servo system. The end result of this approach is that this achieves the desirable feature of allowing an essentially unlimited weight on the roll-stabilized platform, while greatly reducing the cost of the stabilization system in comparison to existing active stabilization systems, where the stabilization drives must move the stabilized platform in inertial space, thus requiring very powerful motors or complex gearing systems.

An alternative embodiment of the present invention provides a low cost, wide view, infrared search and track scanner for an aircraft. This system incorporates a unique two axis stabilization system unlike the common "ball" configuration of existing search track IR scanners or FLIRS. It is composed of a massive stabilized platform, which can mount relatively large and heavy components, while still maintaining a better than ±0.1° two axis attitude stabilization relative to the local vertical. The pitch and roll stabilization is accomplished with COTS galvanometer motors, which are relatively low cost and provide very high angular positioning accuracy.

In accordance with the present embodiment of the invention, the 1024 element silicon array of the previously discussed laser scan system is replaced with a 256 element InSb Infrared array capable of producing thermal search and track scans with high angular resolution at wavelengths up to 5 µm, with a temperture resolution of 0.1° C.

The 256 element or higher InSbLN$_2$ cooled IR detector arrays are designed to fit into the mechanical footprint now occupied by the 1024 element silicon array. The laser is eliminated and the scanner produces a continuous thermal map of the terrain underneath an E-2C aircraft over an angular range of ±45° cross-track relative to the sub aircraft point. Objects seen in this scan will be located within this cross-track 90° field and within the 7.8° along track field. The pitch stabilization mirror discussed in the following section will be able to maintain track of this object as it passed underneath the aircraft's flight path for line of sight angular changes of ±45°. The system will then provide GPS absolute coordinates of the location of the object of interest during the over-flight interval.

Electro-Optical Description of the IRST Scanner

Figure 8:
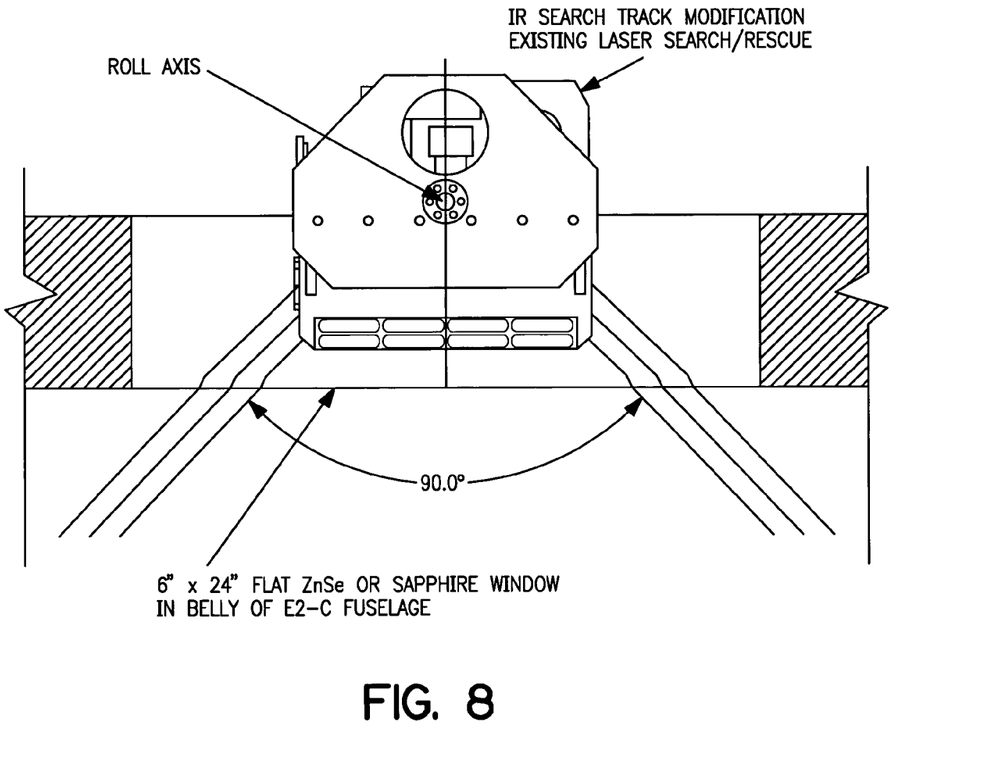
FIG. 8 illustrates the optical head configuration illustrated by FIG. 2, modified to replace the laser scanner with an infrared detector, in accordance with a second embodiment of the present invention.
Figure 9:
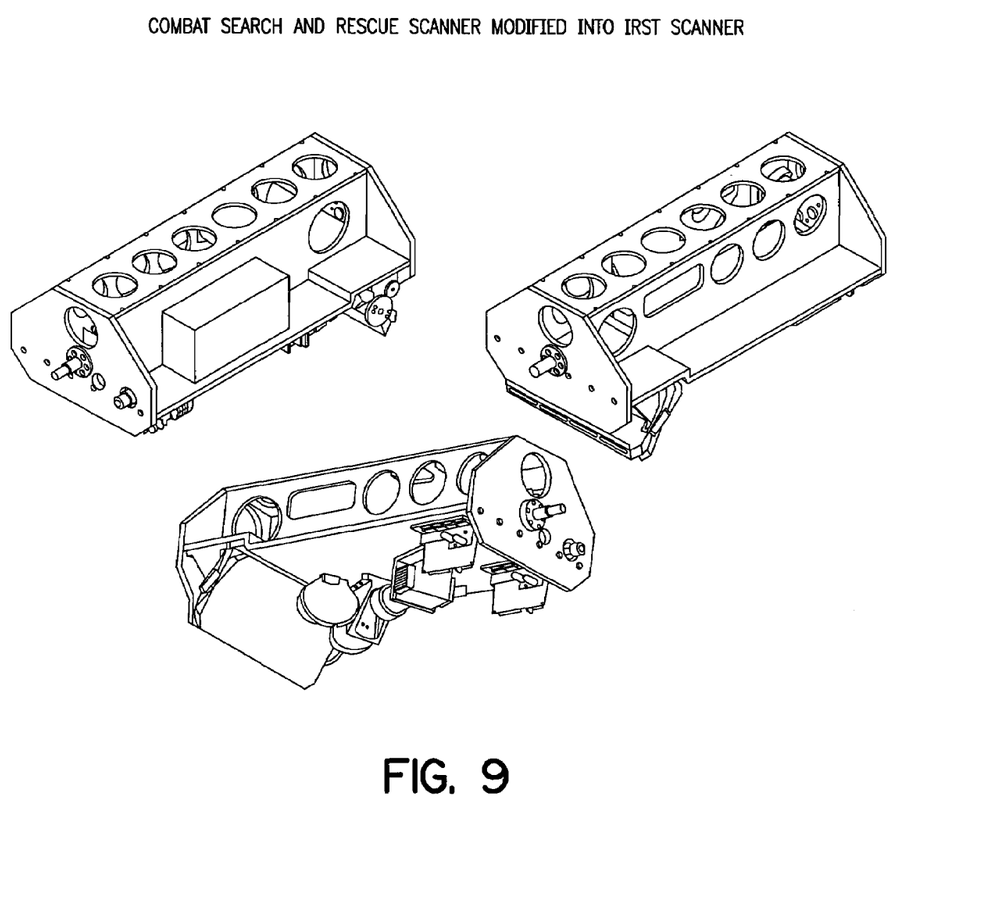
FIG. 9 illustrates the mounting of the infrared detection system in an aircraft in accordance with the second embodiment of the present invention.

As previously discussed herein, FIG. 2 shows views of the Laser Search and Rescue Scanner, discussed with respect to the first embodiment of the present invention. FIG. 8 shows a preliminary conceptual layout of the IRST Scanner. As can be seen, the stabilization system and the all-reflective scanning optics remain essentially unchanged, the laser and the pulsed laser receiver are eliminated, and the 1024 element silicon linear array and its lens is replaced with a LN$_2$ cooled InSb 256 element array, and its Stirling cycle refrigeration cooler. Since the E-2C aircraft does not accept wing pods, the IRST scanner can be mounted in the belly of the E-2C fuselage as is shown in FIG. 9. A ZnSe or Sapphire window aerodynamically flush with the aircraft skin will not significantly affect the aerodynamics.

As can be seen in the conceptual layout illustrated by FIG. 9, the IRST scanner can also be mounted in the belly of the E-2C fuselage with the addition of a 6"×24" flat window, flush with the aircraft skin. This approach will allow ±10° of aircraft roll with negligible reduction in the cross-track scan coverage, and up to ±20° aircraft roll with 80° cross track scan coverage.

The aircraft electrical interfaces required to accomplish this installation are as follows:

1. 115 volt 400 Hz AC power.
2. NTSC or computer monitor display of the scanner IR detection data and terrain map.
3. The current Search and Rescue Scanner incorporates its own vertical reference and GPS system.

Since the system of this alternative embodiment of the invention is a passive infrared detection system and not an active laser scan system, it is unnecessary for the downed pilot or other persons to be located and rescued to wear a reflective device such as the optical corner cube, previously discussed with respect to the laser scan system.

Except as specifically discussed herein, the components and operation of the infrared scan system are the same as that discussed previously herein with respect to the laser scan system.

Calculation of the Radiometric Sensitivity of an IRST Scanner Based Upon Modifications to the Existing Search and Rescue Laser Scanner System Parameters:

---

OPTICS APERTURE AREA $A_o$ = 19 cm$^2$
OPTICS FOCAL LENGTH = 75 mm.
LINEAR ARRAY PIXELS = 256
PIXEL AREA $A_d$ = 50 µm × 50 µm = 25 × 10$^{-6}$ cm$^2$

PIXEL SOLID ANGLE $\Omega$ = 0.039° × 0.039° = 4.63 × 10$^{-7}$ steradian

= 6.8 × 6.8 ft$^2$ at 10,000 ft. altitude

ARRAY SUBTENSE = 10° × 0.039°
PIXEL LOOK TIME FOR 2.6 SEC CROSS TRACK SCAN = 1.1 msec
NOISE BANDWIDTH $\Delta f$ = 144 Hz.
DESIRED NOISE EQUIVALENT TEMPERATURE = 0.1° C. @ 300K
USING AN LN$_2$ COOLED InSb ARRAY WITH A SPECTRAL
RESPONSE OUT TO 5.5 µm
300K TARGET SPECTRAL RADIANCE = 3 × 10$^{-4}$ watts/cm$^2$-ster
$\Delta N_\lambda$ FOR A 1.0° C. CHANGE IN TARGET
TEMPERATURE in the 1–5.5 µm spectral range =
2.8 × 10$^{-6}$ watts/cm$^2$-ster
$P_{detector} = \Delta N_\lambda \times \Omega \times A_o$
$P_{detector}$ = 2.8 × 10$^{-6}$ × 4.63 × 10$^{-7}$ × 19 = 2.46 × 10$^{-11}$ watts
ASSUME D* = 1 × 10$^{11}$ cm-Hz$^{1/2}$-watts $$NEP = \frac{(A_d \times \Delta f)^{1/2}}{D*}$$

$$NEP = \frac{(25 \times 10^{-6} \times 144)^{1/4}}{1 \times 10^{11}} = 6.0 \times 10^{-13} \text{ watts rms.}$$

NET = NEP/$\Delta N_\lambda$ = 6.0 × 10$^{-13}$/2.46 × 10$^{-11}$ = 0.0244° C. rms

---

The invention claimed is:

1. An airborne search and rescue system comprising:
    means mounted to an aircraft for generating and transmitting a laser signal,
    means mounted to a person to be located for reflecting said laser signal back to said aircraft from which said laser signal was transmitted,
    means on said aircraft for processing said reflected laser signal from said means mounted to said person to be located, and
    stabilization means for said search and rescue system, said stabilization means comprising at least one galvanometer motor, wherein said stabilization means is adapted to provide roll stabilization, one said galvanometer motor is adapted to compensate for bearing friction, and said roll stabilization is provided by utilizing the rotational angular inertia of a stabilized platform of said system for reducing the required torque and power of a roll stabilization servo system.

2. The system as claimed in claim 1, wherein said stabilization means comprises two galvanometer motors.

3. The system as claimed in claim 1, wherein said stabilization means is adapted to provide pitch stabilization.

4. The system as claimed in claim 3, wherein said stabilization means comprises a flat mirror.

5. The system as claimed in claim 4, wherein said flat mirror is arranged to be driven by one said galvanometer motor.

6. The system as claimed in claim 5, wherein said flat mirror is arranged to direct a substantially 90° scan pattern generated by a scan mirror in a direction downwards towards the ground.

7. The system as claimed in claim 5, wherein input to said galvanometer motor is obtained from a vertical gyro or inertial measurement unit.

8. The method as claimed in claim 2, wherein one of said two galvanometer motors is adapted to provide pitch stabilization, and the other of said two galvanometer motors is adapted to provide roll stabilization.

9. A method of locating a person, said method comprising:
generating and transmitting a laser signal from an aircraft in flight;
reflecting said laser signal transmitted from said aircraft back to said aircraft by a reflective device mounted on a person to be located;
processing said laser signal back to said aircraft to determine the position of said person to be located, and
providing stabilization of said search and rescue system by at least one galvanometer motor,
wherein the step of Providing stabilization includes the step of providing roll stabilization,
said method further including the step of compensating for bearing friction by one said galvanometer motor,
wherein the step of providing roll stabilization includes the step of utilizing rotational angular inertia of a stabilized platform for reducing the required torque and power of a roll stabilization servo system.

10. The method as claimed in claim 9, wherein the step of providing stabilization includes the step of providing stabilization by two galvanometer motors.

11. The method as claimed in claim 9, wherein the step of providing stabilization includes the step of providing pitch stabilization.

12. The method as claimed in claim 11, wherein the step of providing pitch stabilization includes the step of arranging a flat mirror to be driven by one said galvanometer motor.

13. The method as claimed in claim 12, further including the step of directing a substantially 90° scan pattern generated by a scan mirror in a downward direction towards the ground by said flat mirror.

14. The method claimed in claim 10, further including the steps of:
providing pitch stabilization using one of said two galvanometer motors, and
providing roll stabilization using the other of said two galvanometer motors.

* * * * *